United States Patent
Botter (10) Patent No.: US 7,254,494 B2
(45) Date of Patent: Aug. 7, 2007

(54) ULTRASONIC SIGNAL PROCESSING METHOD AND APPLICATIONS THEREOF

(75) Inventor: Eduard Johannes Botter, Wateringen (NL)

(73) Assignee: Instromet Ultrasonics B.V., Dordrecht (NL)

( * ) Notice: Subject to any disclaimer, the term of this patent is extended or adjusted under 35 U.S.C. 154(b) by 16 days.

(21) Appl. No.: 10/533,748

(22) PCT Filed: Nov. 25, 2002

(86) PCT No.: PCT/NL02/00762

§ 371 (c)(1),
(2), (4) Date: May 4, 2005

(87) PCT Pub. No.: WO2004/048903

PCT Pub. Date: Jun. 10, 2004

(65) Prior Publication Data

US 2006/0015267 A1    Jan. 19, 2006

(51) Int. Cl.
*G01F 1/00*    (2006.01)

(52) U.S. Cl. .............. 702/48; 702/54; 73/861.27; 73/861.28; 73/861.29

(58) Field of Classification Search .............. 702/48, 702/59
See application file for complete search history.

(56) References Cited

U.S. PATENT DOCUMENTS

| 5,818,735 A | 10/1998 | Tigwell et al. |
| 6,796,189 B1 * | 9/2004 | Umekage et al. ........ 73/861.27 |

* cited by examiner

*Primary Examiner*—John Barlow
*Assistant Examiner*—Stephen J. Cherry
(74) *Attorney, Agent, or Firm*—Troutman Sanders LLP; Ryan A. Schneider; James Hunt Yancey, Jr.

(57) ABSTRACT

An ultrasonic signal processing method for improving the signal-to-noise ratio in ultrasonic measurements comprises the transmission of a predefined timed sequence of a number of ultrasonic burst signals at a first transducer, and reception of a signal representing said transmitted sequence of ultrasonic burst signals at a second transducer. This signal is processed by addition of multiple time-shifted copies of the received signal to said original received signal to obtain a sum of the original received signal and its time-shifted copies. An original burst signal having an improved signal-to-noise ratio is reconstructed from this sum.

16 Claims, 7 Drawing Sheets

ULTRASONIC SIGNAL PROCESSING METHOD AND APPLICATIONS THEREOF

This application is a U.S. National Stage of International Application No. PCT/NL2002/000762 filed 25 Nov. 2002.

TECHNICAL FIELD

The invention relates to an ultrasonic signal processing method, in particular for ultrasonic measurement devices such as flow meters. More particularly, a signal processing technique is disclosed for improving the signal-to-noise ratio in ultrasonic measurement devices that operate in a noisy environment, for example ultrasonic flow meters in the vicinity of a pressure reducing valve.

BACKGROUND

Ultrasonic gas flow meters measure the gas flow by means of ultrasonic signals. For this purpose an ultrasonic gas flow meter has one or more acoustic paths, each path being defined between a pair of ultrasonic transducers. Each transducer of such a pair is capable of transmitting signals to, and receiving signals from the other transducer. When operating, both transducers in turn transmit and receive, resulting in an acoustic signal that travels along the acoustic path—either parallel or at an angle—inside the meter body with the flow direction (downstream) and against the flow direction (upstream). The difference in travel time for both transmission directions is proportional to the gas velocity. In order to measure even low gas velocities accurately, the travel times itself or the difference in travel time need to be measured with very high accuracy and resolution in time.

Typically, ultrasonic gas flow meters operate using a number of short bursts of high frequency signals (for example 5 cycles long). Typically, the operating frequency of ultrasonic transducers is in the range between 50 kHz and 500 kHz. As in ultrasonic gas flow meters differences in travel times need to be measured extremely accurately, a very high definition or resolution in the travel time measurement is a must. This cannot be achieved by using the envelope of the received burst signal, even if this is a short one. In order to obtain sufficient resolution, the exact time of the zero crossings in the burst signal is required. As typically multiple zero crossings are present in the burst signal, this creates the problem of identifying and locating one or more specific zero crossings, to be used as reference point(s) for the travel time measurement. This may be resolved with the aid of the shape of the envelope of the burst signal.

In a gas pipeline, ultrasonic noise may be emitted from various other sources. The frequency spectrum of such noise may extend into the frequency range where the ultrasonic transducers operate. Such noise may be flow induced noise, or equipment induced noise, such as noise emitted by pressure reducing valves. The latter type of interfering noise is more severe, especially when such pressure reducing valves operate at high pressure differentials, for example above 10 or 20 bar. Under these circumstances the amount of dissipated energy can be quite substantial. Even if only a very small fraction thereof is converted into acoustic energy, still a serious amount of noise may be emitted.

The noise from such valves may be characterised by having some dominant peaks at discrete (low) frequencies, but more appropriately it is described as broadband noise. The envelope of the frequency spectrum typically has a maximum in the range between 30 kHz and 80 kHz. This indicates that even outside this frequency range substantial amounts of ultrasonic energy may be present.

The same holds for valves that have been designed to be so-called "silent valves". The word "silent" typically applies to the noise in the audible range. Sometimes reduction of noise in the audible range is achieved by design modifications that shift the emission of noise to higher frequencies. As this noise is broadband by nature, it easily extends into the frequency range where ultrasonic transducers for ultrasonic gas flow meters may operate.

Due to practical limitations the power of the signals used in an ultrasonic flow meter is restricted to certain levels. The problem arises that either the noise interferes with the ultrasonic signals of the flow meter, or the ultrasonic signals of the flow meter may even become completely buried or masked by the noise. As a result of this the ultrasonic signals used by the flow meter may become undetectable and therefore the meter may become un-operational.

Until now in various ways, attempts have been made to resolve the problem of acoustic noise interfering with the signals of an ultrasonic flow meter.

Attempts have been made to resolve the problem of acoustic noise interfering with the signals of an ultrasonic flow meter by separating the ultrasonic gas flow meter and the noise source spatially. This means separating the two by applying a long length of pipe, preferably also including elbows and T-bends, between the meter and the noise source. As available space does not always allow for such an approach, this method may not only be costly but often is impractical as well.

Moving the operating frequency of the flow meter away from the frequency range of the ultrasonic noise has also been attempted. Due to the increase of attenuation of the ultrasonic signal in the fluid with increasing frequencies, for practical application the usable frequency range is limited to a maximum of about 300 to 500 kHz. This puts a limit on the gain that can be achieved in this way.

Special silencing devices have been designed to separate the noise source and the ultrasonic flow meter respective to each other. The effectiveness of such devices is limited as these devices themselves may generate noise (flow induced noise) at higher gas velocities, and again considerable costs may be involved.

Also attempts have been made to apply a variety of signal processing techniques in order to improve the signal-to-noise ratio, described as filtering, averaging, stacking and correlation.

Applying filtering techniques in the frequency domain does not provide much improvement as the frequency spectrum of the noise often overlaps with the operating frequency of the ultrasonic flow meter. Typically also the ultrasonic transducers are operated in a resonating mode in order to achieve the highest efficiency, consequently the transducers themselves act as frequency selective devices. Therefore, using additional electronic circuitry or software for filtering the signal in the frequency domain will not be very effective.

Improvement of the signal-to-noise ratio may be achieved by increasing the amount of ultrasonic energy by extending the duration of the burst signal. This suffers from the problem that it becomes more difficult to uniquely identify and locate a specific zero crossing with the aid of the shape of the envelope, or suffers from ambiguity when phase detection techniques are used, since the travel time to be measured represents multiple periods of the signal and the phase shift is multiple times $2\pi$.

Another known method for improving the signal-to-noise ratio is referenced as stacking. This means averaging the signal that is obtained by repeatedly sending and receiving an ultrasonic signal. The assumption is that the received burst signals are correlated, such that addition of multiple received burst signals results in an increased signal, while the noise is uncorrelated and therefore will be reduced when multiple received signals are added up. The received signals are added taking the time of the emission as a reference point in order to synchronise the received burst signals while these are being added.

This method as well has limitations because of the natural turbulence in gas flow. The turbulence results in a variability of travel time (also known as "jitter") as a result of which the received burst signals become uncorrelated. This means that using the time of emission as a reference point, the received signals do not coincide exactly when being added. The averaging or stacking technique is therefore only effective on a short time scale: a time scale short enough, in comparison to the periodicity of the turbulence phenomena, to limit the variances in travel time to values substantially smaller than one period of the frequency in the burst signal. This limits the number of the received burst signals that can effectively be added up in order to increase the signal-to-noise ratio.

In the description of the above method the assumption has been made that each cycle of emitting an ultrasonic burst signal and receiving the same signal is completed before the next one is initiated. A new cycle therefore can only start after the acoustic signal has travelled across the fluid along its acoustic path, which may take up to several milliseconds, especially for a large size meter having long acoustic paths. This limits the number of pulses to the number that can be sent within a specific time interval, i.e. the time that the acoustic signals as received can be considered to be correlated.

As an alternative to this method, the process of sending and receiving of acoustic pulses could be interleaved or overlapping, meaning that acoustic pulses (burst signals) are being fired while previous acoustic pulses are still travelling trough the gas. As a result of this, a sequence of acoustic pulses will arrive at the receiver. The problem with this alternative method, however, is to identify each of the pulses from a sequence when they arrive, as they may be heavily distorted by the acoustic noise, or even buried or masked by the acoustic noise. Averaging the individual burst signals within a sequence using the known repetition rate of the firing of the pulses, will help to recover the pulse from the noise and make the pulses detectable, but results in ambiguity. This means that the burst signal may be retrieved at various points in time, while not being able to detect which one actually represents the travel time.

Correlation techniques are general-purpose signal processing tools that can be applied to a variety of electronic measurements. Major uses are the detection of the presence and the location of signals buried in noise. The waveform of the signal is generally known, for example the signal transmitted by an ultrasonic transducer. The correlation process incrementally slides the reference waveform over the signal being processed, looking for a matching signal. Signals that are not related to the reference waveform result in a correlation value of 0. If a matching signal is found, the correlation value increases to a maximum value of 1 for a perfect match and −1 for a matching but inverted waveform. The maximum value of the correlation function serves both purposes. If the maximum value is close to 1 the desired signal is present, and the location of the maximum is a measure of the propagation delay (or travel time).

The application of the correlation function to the travel time measurement in an ultrasonic meter suffers from several drawbacks. It is computationally intensive (i.e. it requires a great deal of processing power), and considering the very high time resolution that is required for the travel time measurement, it requires very high sampling rates.

SUMMARY OF THE INVENTION

In view of the above drawbacks of the prior art it is an object of the invention to provide an ultrasonic signal processing technique that enhances the signal to noise ratio, in particular under noisy circumstances.

A further object of the invention is to provide an ultrasonic signal processing technique that allows for the unambiguous identification of a single ultrasonic burst signal within a received signal representing a series of subsequently transmitted burst signals.

Another object of the invention is to provide an accurate measurement of the travel time of an ultrasonic signal.

Still another object is to provide an accurate determination method of a flow characteristic of a fluid, such as a gas or liquid, for example flow velocity, using an ultrasonic measurement technique.

A still further object of the invention is to provide a device, capable of carrying out such methods or measurements.

According to a first aspect the invention relates to a signal processing method for improving the signal-to-noise ratio in ultrasonic measurements, the method comprising transmission of a predefined timed sequence of a number of ultrasonic burst signals at a first transducer, wherein the time periods between subsequently transmitted burst signals of said sequence are set according to a non-uniform pattern, wherein at least one time period differs from an other time period, and reception of a signal representing said transmitted sequence of ultrasonic burst signals at a second transducer, addition of multiple time-shifted copies of the received signal to said original received signal to obtain a sum of the original received signal and its time-shifted copies, wherein the time shift of a copy is related to said predefined pattern, and reconstruction of an original burst signal having an improved signal-to-noise ratio from said sum.

The signal processing method according to the invention comprises transmitting a sequence of short burst signals in a relatively short time interval. In this sequence a next burst may be transmitted before the preceding burst has arrived at the receiving transducer. As a result the time interval in which the total sequence of burst signals is emitted, may overlap the time interval in which the sequence of burst signals is received at the receiving transducer. According to the invention the ultrasonic burst signals are transmitted corresponding to a non-uniform pattern. This means that the time period between subsequently transmitted ultrasonic burst signals is not constant. Instead thereof at least one time period is different from the other time periods.

While one transducer of a pair of transducers defining an acoustic path, emits a sequence of burst signals, a signal representing the sequence of burst signals received at the other transducer is digitised and stored in a memory for further processing. This stored signal contains the complete series of burst signals as sent, although at first sight the individual burst signals from the transmitted sequence may not be recognisable because of the noise that is present.

The signal processing method involves creating multiple time-shifted copies of the received signal representing the transmitted sequence of the burst signals. The time shifts between the copies of the received signal are related to the non-uniform pattern, such that unambiguously one or more signal bursts (but preferably one) having an improved signal-to-ratio signal can be reconstructed. As a result of the addition, in the resulting sum a reconstructed enlarged signal representing one signal burst from the originally transmitted sequence is achieved, while the remaining part of the originally received signal representing the noise and the other signal bursts form the initially transmitted sequence are attenuated or cancelled. Thus the accurate travel time of this reconstructed signal can be measured, and used e.g. for calculation of the distance travelled or a flow characteristic.

According to a second aspect the invention relates to a method of determining a flow characteristic of a fluid in a conduit using an ultrasonic measurement device, comprising transmitting a predefined timed sequence of a number of ultrasonic burst signals at a first transducer, such that the time periods between subsequently transmitted burst signals of said sequence are set according to a non-uniform pattern, and receiving a signal representing said sequence of ultrasonic burst signals at a second transducer, adding multiple time-shifted copies of the received signal to obtain a sum of the original received signal and its time-shifted copies, wherein the time shifts are related to said predefined pattern, reconstructing an original burst signal, determining the travel time of said reconstructed original burst signal, and calculating the flow characteristic using said travel time. Because in this method according to the invention the principles of the ultrasonic signal processing method according to the invention as discussed above are applied, the original burst signal can be reconstructed accurately and unambiguously, with the result that the travel time can be calculated accurately, as well as the flow characteristic related to this travel time. Examples of such a flow characteristic are flow velocity and flow throughput, energy content of a fuel gas such as natural gas, and the like.

A further aspect of the invention is directed to a device for determining a flow characteristic of a fluid in a conduit, comprising ultrasonic transmission means for providing a predefined timed sequence of a number of ultrasonic burst signals for injection into the fluid, timing means for setting the transmission time of each burst signal of said sequence according to a predefined non-uniform pattern, ultrasonic reception means for receiving a signal representing said sequence of ultrasonic burst signals, and signal processing means for processing said signal in order to determine the flow characteristic from said signal, wherein the signal processing means comprise means for providing multiple time-shifted copies of the received signal which copies are time-shifted according to a predefined relationship with said non-uniform pattern, and for adding the multiple time-shifted copies of the received signal to the received signal, and for reconstructing an original burst signal, and for calculating the flow characteristic using said reconstructed original burst signal.

BRIEF DESCRIPTION OF THE DRAWINGS

The invention is further illustrated by means of the attached drawings, in which.

DESCRIPTION OF THE PREFERRED EMBODIMENTS

In a preferred embodiment all time periods between subsequently transmitted signals of said sequence are different. In this embodiment none of the time periods is the same, but they are set to different values. For example, the time periods increase incrementally with respect to the previous time period. This allows for the reconstruction of only one burst signal from the received total signal.

In a further preferred embodiment the number of copies is equal to the number of burst signals in said sequence minus one, so that the number of factors to be added, i.e. the originally received signal and its copies, is equal to the total number of burst signals in the transmitted sequence.

More preferably the time shifts are proportional, most preferably identical, to said time periods. This means that the non-uniform pattern is selected in such a way that in each time-shifted copy of the received signal, just one burst signal out of the whole sequence coincides with a specific one out of the originally received signal. Adding the time-shifted copies of the sequence results in reduction or even cancellation of the noise while the selected burst signal that coincides every time increases in amplitude. In this way the signal-to-noise ratio improves and the original single burst signal is reconstructed, without ambiguity.

It is advantageous to reconstruct the shape of an original burst signal, because this allows defining at least one specific zero crossing as a reference which can be used, for example for determining the travel time of the acoustic signal.

The signal processing method according to the invention has some similarity with the "averaging" or "stacking" method discussed above. However, in the method according to the invention the transmitted sequence of burst signals contains specific timing information that allows reconstructing a specific sample from the sequence. The method has also some similarity to correlation techniques, since the received signal is reconstructed using the original transmitted signal. However in the correlation techniques a correlation function is a function of two variables, and the result needs not to have any similarity to the original burst signal, whereas in this invention the multiple time-shifted copies are used to reconstruct the original signal shape. The reconstructed signal can then be used to identify a specific zero crossing as a reference point for measuring the travel time of the acoustic signal, e.g. in an ultrasonic flow meter for determining a flow characteristic of a fluid, such as gas, in a conduit.

In addition to flow meters, the ultrasonic signal processing method according to the invention can also be used in ultrasonic distance measurement devices. In an ultrasonic distance measurement system the travel time of sequence of burst signals launched in one direction by a first transducer and subsequently received by the same or another transducer is sufficient to determine the distance to be measured.

According to a second aspect the invention relates to a method of determining a flow characteristic of a fluid in a conduit using an ultrasonic measurement device, comprising transmitting a predefined timed sequence of a number of ultrasonic burst signals at a first transducer, such that the time periods between subsequently transmitted burst signals of said sequence are set according to a non-uniform pattern, and receiving a signal representing said sequence of ultrasonic burst signals at a second transducer, adding multiple time-shifted copies of the received signal to obtain a sum of the original received signal and its time-shifted copies, wherein the time shifts are related to said predefined pattern, reconstructing an original burst signal, determining the travel time of said reconstructed original burst signal, and calculating the flow characteristic using said travel time. Because in this method according to the invention the principles of the ultrasonic signal processing method according to the invention as discussed above are applied, the original burst signal can be reconstructed accurately and unambiguously, with the result that the travel time can be calculated accurately, as well as the flow characteristic related to this travel time. Examples of such a flow characteristic are flow velocity and flow throughput, energy content of a fuel gas such as natural gas, and the like.

The above identified preferred embodiments of the signal processing method according to the invention are likewise applicable to this second aspect of the invention.

A further aspect of the invention is directed to a device for determining a flow characteristic of a fluid in a conduit, comprising ultrasonic transmission means for providing a predefined timed sequence of a number of ultrasonic burst signals for injection into the fluid, timing means for setting the transmission time of each burst signal of said sequence according to a predefined non-uniform pattern, ultrasonic reception means for receiving a signal representing said sequence of ultrasonic burst signals, and signal processing means for processing said signal in order to determine the flow characteristic from said signal, wherein the signal processing means comprise means for providing multiple time-shifted copies of the received signal which copies are time-shifted according to a predefined relationship with said non-uniform pattern, and for adding the multiple time-shifted copies of the received signal to the received signal, and for reconstructing an original burst signal, and for calculating the flow characteristic using said reconstructed original burst signal.

In this device according to the invention the signal processing means are designed in such a way that a number of time-shifted copies of the received are created. These copies are added to the originally received signal. From the sum an originally fired burst signal is obtained, from which in turn the desired flow characteristic is calculated. For example, the flow velocity can be obtained from the difference in travel time of a sequence of burst signals transmitted in the direction of the flow (downstream) and of a sequence of burst signals transmitted in the opposite direction (upstream).

Preferably the means are designed such that the means allow performing the preferred embodiments of the method according to the invention as described above.

Figure 1:
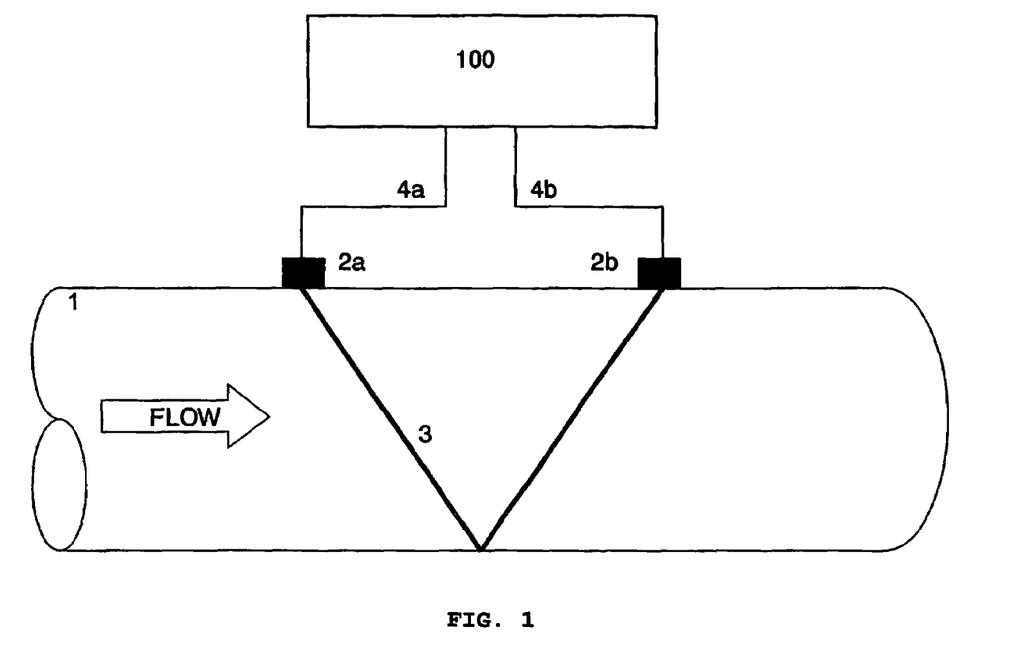
FIG. 1 shows the basic elements of a single-path ultrasonic flow meter.

FIG. 1 shows the basic elements of an example of a flow measurement system for determining the fluid flow in a cylindrical conduit 1. From a pair of transducers 2a, 2b, each one is connected by electrical leads 4a and 4b respectively to a signal processing unit identified in its entirety by reference numeral 100. The transducers 2a, 2b are positioned such that they define an interrogation path 3 with precisely defined geometric dimensions. The interrogation path shown in FIG. 1 is a bounce-type centerline path. However, other arrangements of transducers and path configurations are possible, e.g. an inscribed triangle (having two bounces against the wall of the conduit).

Figure 2:
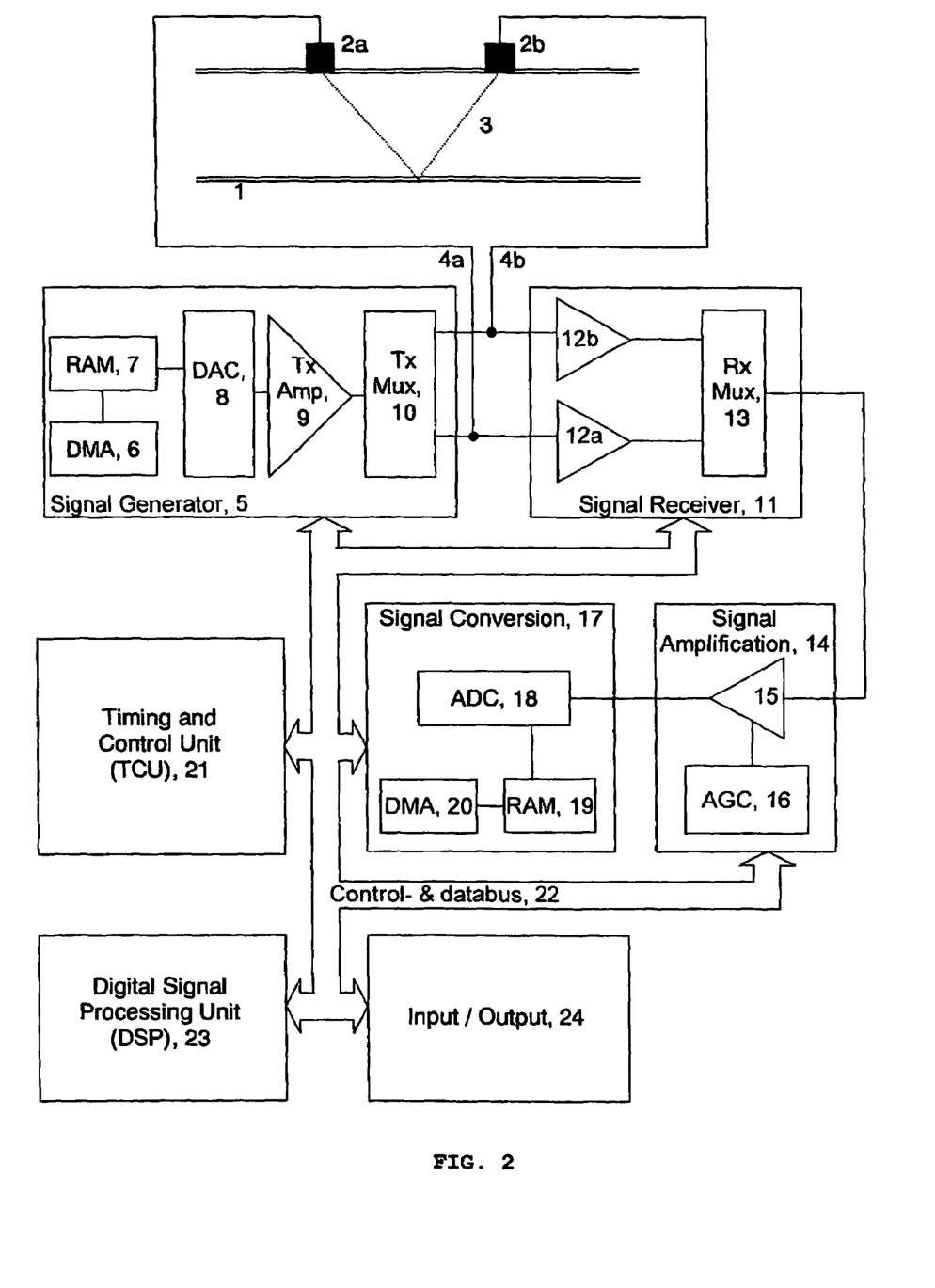
FIG. 2 is a block diagram of an ultrasonic flow meter according to the invention.

FIG. 2 is a block diagram of an ultrasonic flow meter according to the present invention. A pair of transducers 2a, 2b is mounted on a conduit 1, defining an interrogation path 3. The transducers 2a, 2b are connected by electrical leads 4a, 4b to both a signal generator 5 and a signal receiver 11. The signal generator 5 is controlled by a timing and control unit (TCU) 21 via control and data bus 22 to provide the one or more transducers 2a, 2b with an ultrasonic signal at defined instants in time. The transmit signal itself is calculated by a digital signal processor (DSP) 23 and loaded into the signal generator's RAM 7 by means of direct memory access (DMA) 6. Controlled by the TCU 21 the signal generator 5 shifts the transmit signal stored in RAM 7 sequentially to digital-to-analogue converter (DAC) 8. The output of DAC 8 is amplified by power amplifier 9. A transmit multiplexer 10 provides one or more transducers 2a, 2b with the ultrasonic signal to be transmitted.

The transducers 2a, 2b are also connected to the signal receiver 11. The signal receiver 11 consists of buffers/preamplifiers 12a, 12b and a receive multiplexer 13. Similarly to the signal generator 5, the signal receiver 11 is controlled by the TCU 21 to provide the appropriate transducer signals to a signal amplifier 14. The signal amplifier 14 is controlled by an automatic gain controller (AGC) 16. The amplified signal is then digitised by the signal converter 17. Controlled by the TCU 21 the analogue-to-digital converter (ADC) 18 writes the sampled signal to a RAM 19. The contents of RAM 19 can be accessed by means of direct memory access (DMA) 20. The digital signal processing unit DSP 23 processes the sampled data of RAM 19 according to the invention. Data at various processing stages can be made available at the user interface by means of input/output unit 24.

FIG. 3 shows the transmitted and received waveforms of a conventional ultrasonic flow meter.

Figure 3A:
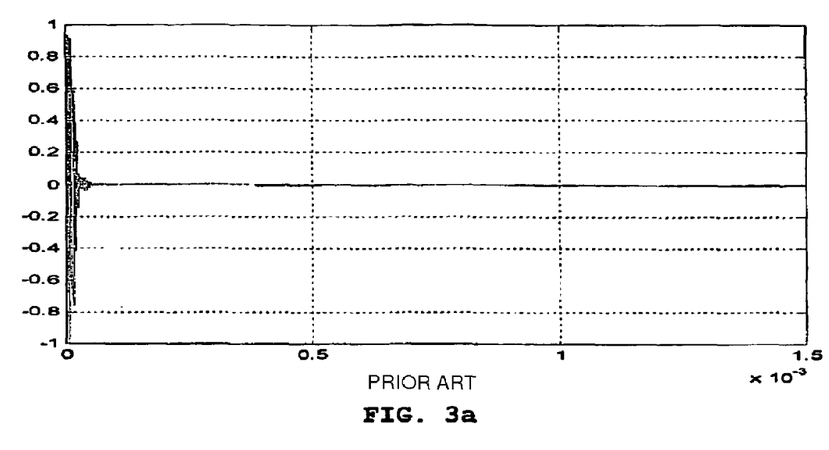
FIGS. 3a-3e show the transmitted and received waveforms of an ultrasonic flow meter according to the prior art.

FIG. 3a shows an example of a transmitted waveform of an ultrasonic transducer with a center frequency of approximately 200 kHz and a bandwidth of approximately 40 kHz. The impulse response (Y-axis) of a transducer 2a, 2b is shown as a function of time (X-axis; seconds).

Figure 3B:
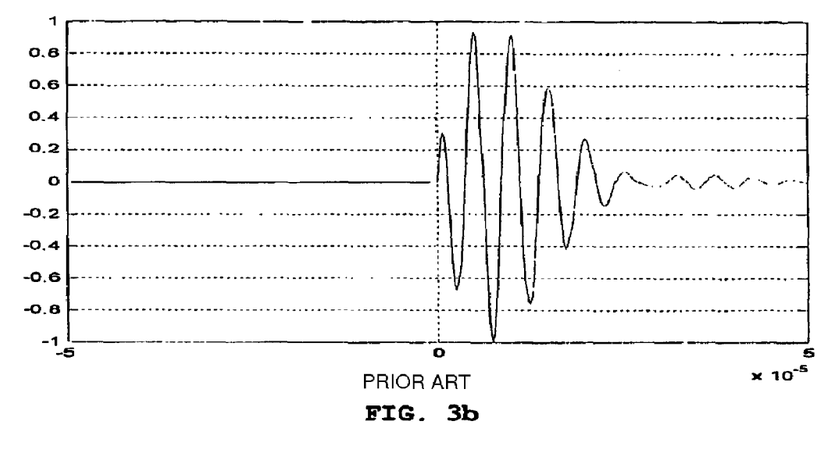

FIG. 3b shows the waveform of FIG. 3a, but "zoomed in" to about 10 cycles (of the 200 kHz transducer frequency) both before (t<0) and after (t>0) triggering the transducer.

Figure 3C:
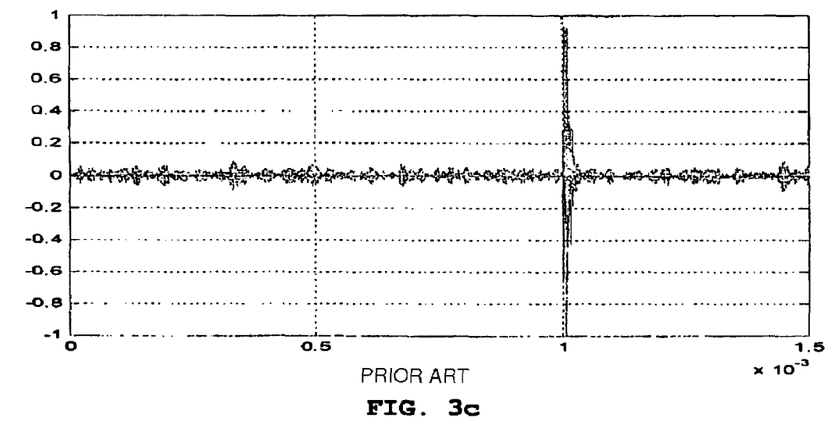

FIG. 3c shows the received waveform at moderate signal-to-noise ratio. The signal propagation time between a pair of transducers is 1 millisecond (ms).

Figure 3D:
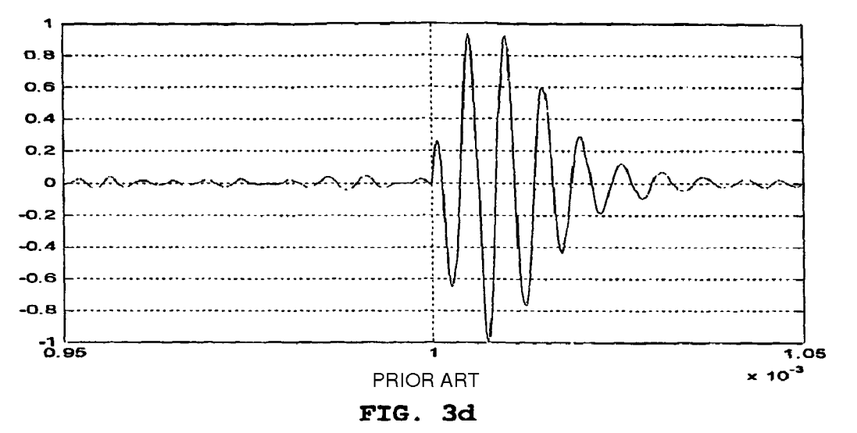

FIG. 3d shows the waveform of FIG. 3c, but "zoomed in" to about 10 cycles of the 200 kHz transducer frequency both before and after the propagation delay. The received waveform shows good conformity with the transmitted waveform. Various methods are applicable to the detection of the presence of this waveform and the estimation of the propagation delay, including very simple ones like thresholding the signal.

Figure 3E:
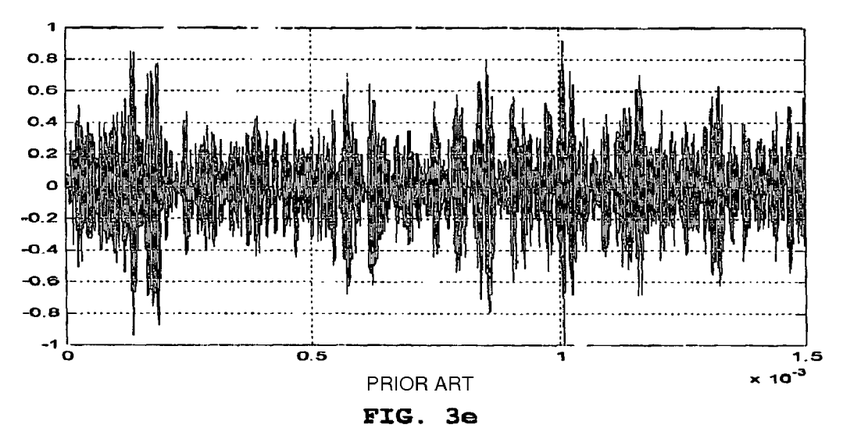

FIG. 3e shows the received waveform at very low signal-to-noise ratio. Again the signal propagation time is 1 millisecond (ms). It is apparent that the waveform of the originally transmitted signal is completely obscured by noise. Thus, it is not possible to detect the presence and the propagation delay of the transmitted signal.

FIG. 4 shows the transmitted and received waveforms according to the invention.

Figure 4A:
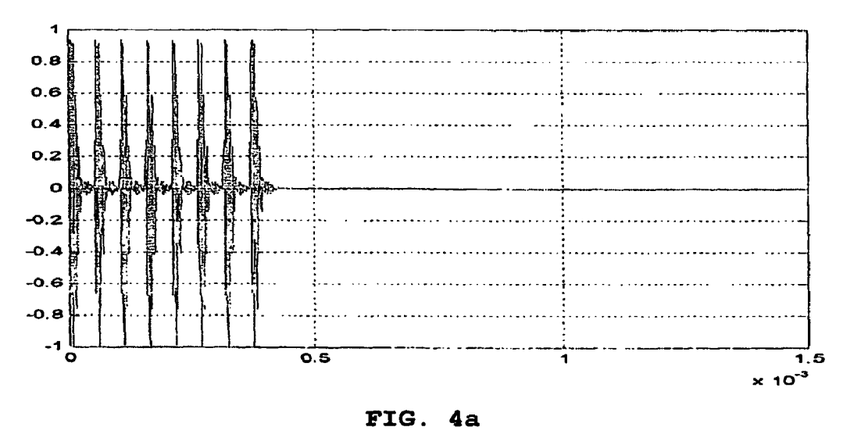
FIG. 4 shows the transmitted and received waveforms according to the invention.

FIG. 4a shows a sample transmitted waveform consisting of 8 individual bursts having waveforms similar to the transmit waveform of FIGS. 3a and 3b. In other words the sequence consists of 8 ultrasonic burst signals. In this example of the invention the spacing of the individual waveforms is not uniform, but time-sweept, i.e. all spacings are different.

Figure 4B:
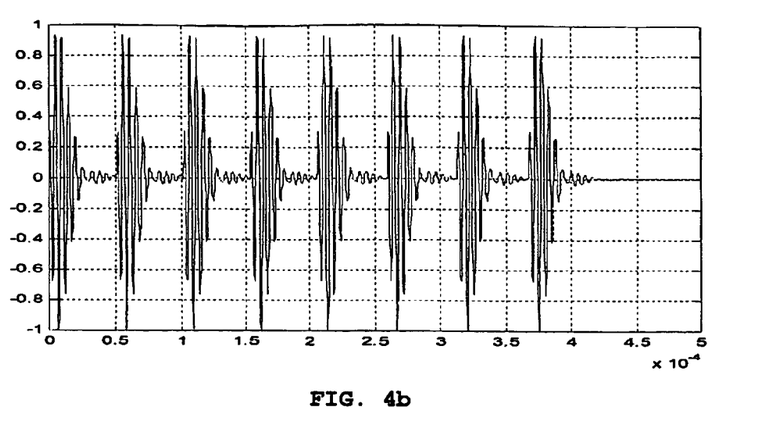

FIG. 4b represents the waveform of FIG. 4a, but again "zoomed in" to show the individual wavelets or ultrasonic burst signals and associated spacings in more detail.

Figure 4C:
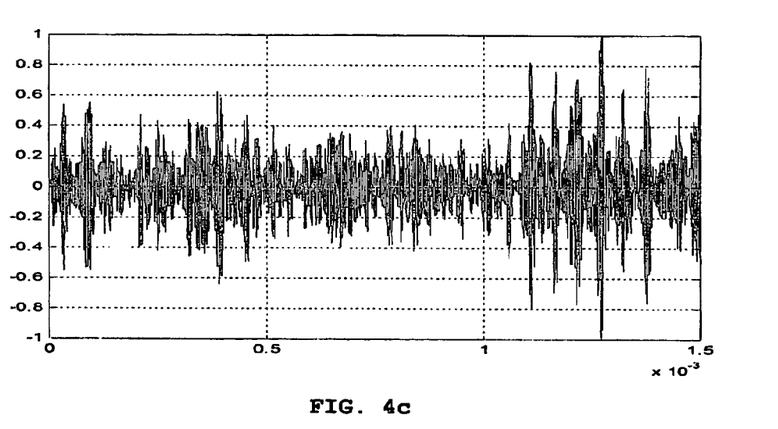

FIG. 4c shows the received waveform at very low signal-to-noise ratio (comparable to the signal-to-noise ratio as shown in FIG. 3e). The propagation delay is 1 millisecond (ms). Much like the situation depicted in FIG. 3e, in the signal as received the transmitted individual wavelets are obscured by noise.

Figure 4D:
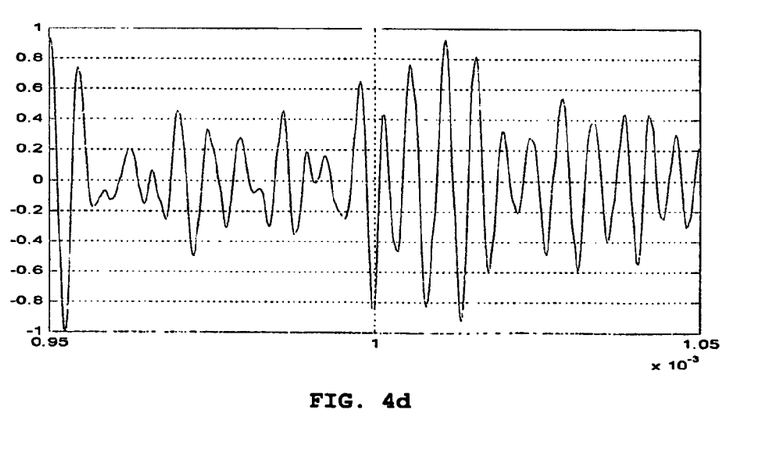

FIG. 4d shows the waveform of FIG. 4c, but "zoomed in" to about 10 cycles (of the 200 kHz transducer frequency) both before and after the propagation delay.

FIG. 5 shows the waveforms, as processed according to the invention.

Figure 5A:
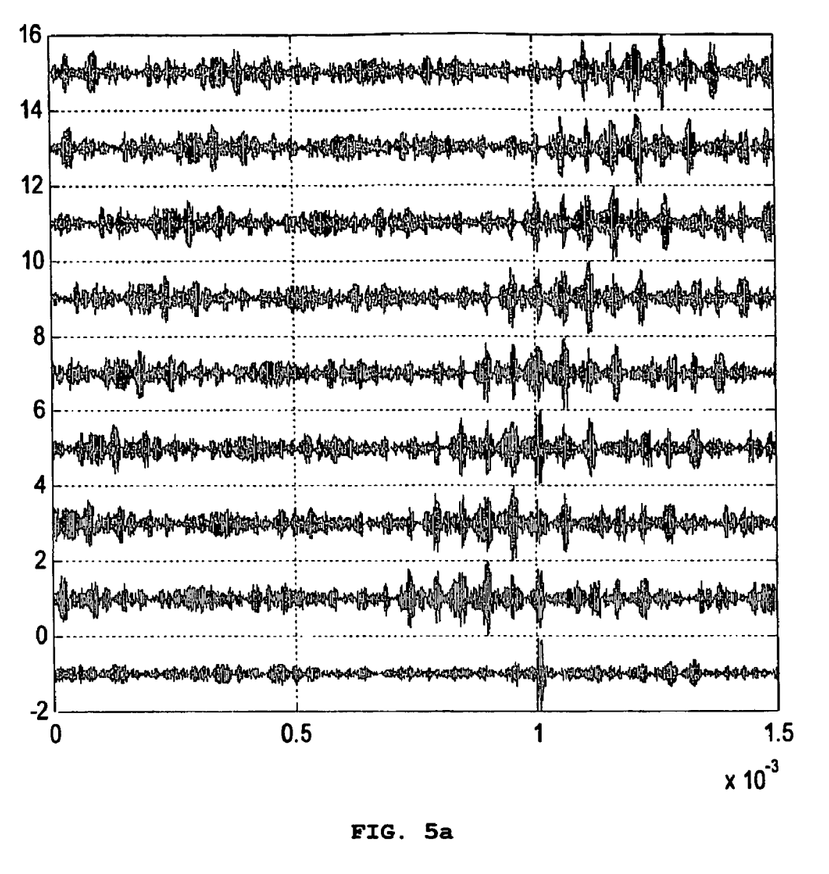
FIG. 5 shows the processed waveforms according to the invention.

In FIG. 5a the topmost trace is identical to the received waveform shown in FIG. 4c. The 7 traces below the topmost trace are time-shifted copies of the received waveform. The time shifts are identical to the spacings of the transmitted individual wavelets (FIGS. 4a and 4b). The bottom trace is the sum of the original received waveform and its time-shifted copies.

Figure 5B:
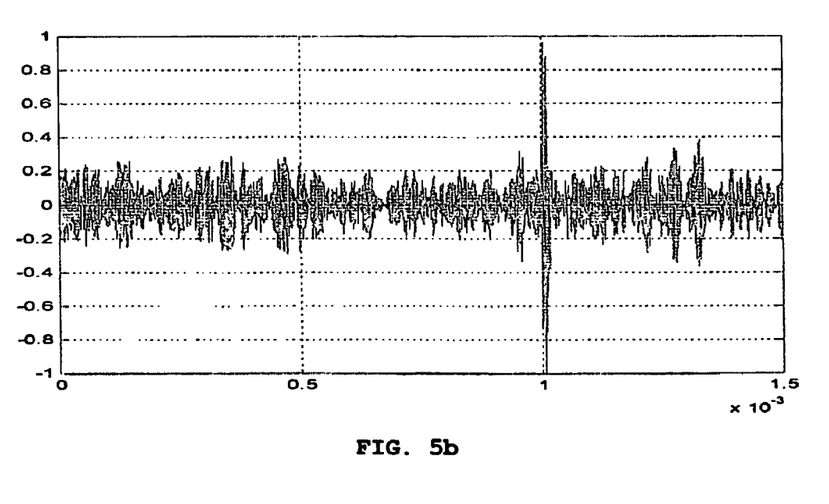

FIG. 5b shows the same processed waveform as shown by the bottom trace of FIG. 5a: the sum of the original received waveform and its time-shifted copies. This processed "received" waveform has all the characteristics of the received waveform resulting from the transmission of a single wavelet, but at improved signal to noise ratio.

Figure 5C:
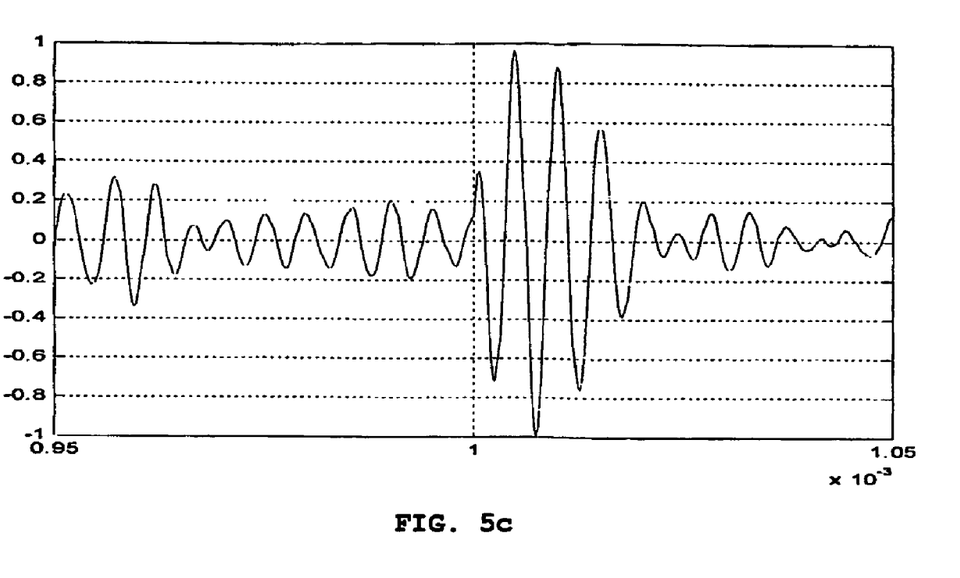

FIG. 5c shows the waveform of FIG. 5b, but "zoomed in" to about 10 cycles (of the 200 kHz transducer frequency) both before and after the propagation delay.

It is apparent that the signal processing method according to the invention results in the reconstruction of a burst signal out of the originally transmitted series, which is not masked, buried or otherwise obscured by noise or other transmitted burst signals from the series. The travel time of this reconstructed signal can be determined accurately.

The invention claimed is:

1. A method to obtain an ultrasonic measurement signal having an improved signal to noise ratio to determine characteristics of a fluid flow, the method comprising
transmission of a predefined timed sequence of a number of ultrasonic burst signals at a first transducer, the burst signals being transmitted within a fluid flow, wherein the time periods between subsequently transmitted burst signals of said sequence are set according to a non-uniform pattern, wherein at least one time period differs from an other time period, and
reception of a signal representing said transmitted sequence of ultrasonic burst signals at a second transducer,
addition of multiple time-shifted copies of the received signal to said original received signal to obtain a sum of the original received signal and its time-shifted copies, wherein the time shift of a copy is related to said predefined pattern, and
providing a reconstruction of an original burst signal having an improved signal to noise ratio from said sum to determine characteristics of the fluid flow.

2. A signal processing method according to claim 1, wherein all time periods between subsequently transmitted signals of said sequence are different.

3. A signal processing method according to claim 1, wherein the number of copies is equal to the number of burst signals in said sequence minus one.

4. A signal processing method according to claim 1, wherein the time shifts are proportional to said time periods.

5. A signal processing method according to claim 1, wherein a single burst signal is reconstructed.

6. A signal processing method according to claim 1, wherein the shape of an original burst signal is reconstructed.

7. A signal processing method according to claim 1, wherein the travel time of the reconstructed original burst signal is determined.

8. A method of determining a flow characteristic of a fluid in a conduit using an ultrasonic measurement device, comprising
transmitting a predefined timed sequence of a number of ultrasonic burst signals within the fluid at a first transducer, such that the time periods between subsequently transmitted burst signals of said sequence are set according to a non-uniform pattern, and
storing a signal representing said sequence of ultrasonic burst signals at a second transducer, adding multiple time-shifted copies of the received signal to obtain a sum of the original received signal and its time-shifted copies, wherein the time shifts are related to said predefined pattern,
providing a reconstruction of an original burst signal, determining the travel time of said reconstructed original burst signal, and calculating the flow characteristic of the fluid using said travel time.

9. A method according to claim 8, wherein all time periods between the subsequently transmitted signals of said sequence are different.

10. A method according to claim 8, wherein the number of copies is equal to the number of burst signals in said sequence minus one.

11. A method according to claim 8, wherein the time shifts are proportional to said time periods.

12. A method according to claim 8, wherein a single burst signal is reconstructed.

13. A method according to claim 8, wherein the shape of an original burst signal is reconstructed.

14. A method according to claim 8, wherein a zero crossing from said reconstructed burst signal is defined as a reference for determining the travel time of said reconstructed burst signal.

15. A method according to claim 8, wherein the flow velocity of the fluid is determined.

16. Device for determining a flow characteristic of a fluid in a conduit, comprising ultrasonic transmission means for providing a predefined timed sequence of a number of ultrasonic burst signals for injection into the fluid, timing means for setting the transmission time of each burst signal of said sequence according to a predefined non-uniform pattern, ultrasonic reception means for receiving a signal, representing said sequence of ultrasonic burst signals, and signal processing means for processing said signal in order to determine the flow characteristic from said signal, wherein the signal processing means comprise means for providing multiple time-shifted copies of the received signal which copies are time shifted according to a predefined relationship with said non-uniform pattern, and for adding the multiple time-shifted copies of the received signal to the received signal, and for reconstructing an original burst signal, and for calculating the flow characteristic using said reconstructed original burst signal.

* * * * *